US008156154B2

(12) United States Patent
Taranov et al.

(10) Patent No.: US 8,156,154 B2
(45) Date of Patent: Apr. 10, 2012

(54) TECHNIQUES TO MANAGE A TAXONOMY SYSTEM FOR HETEROGENEOUS RESOURCE DOMAIN

(75) Inventors: Viktoriya Taranov, Bellevue, WA (US); Daniel E. Kogan, Issaquah, WA (US); Patrick C. Miller, Sammamish, WA (US); Michal K. Piaseczny, Bellevue, WA (US); Gerhard Schobbe, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 520 days.

(21) Appl. No.: 11/702,391

(22) Filed: Feb. 5, 2007

(65) Prior Publication Data

US 2008/0189312 A1 Aug. 7, 2008

(51) Int. Cl.
*G06F 17/30* (2006.01)
(52) U.S. Cl. ...................................... 707/802
(58) Field of Classification Search .................. None
See application file for complete search history.

(56) References Cited

U.S. PATENT DOCUMENTS

| | | | |
|---|---|---|---|
| 6,947,947 | B2 | 9/2005 | Block et al. |
| 7,620,720 | B1 * | 11/2009 | Gasser ........................ 709/226 |
| 2002/0107829 | A1 | 8/2002 | Sigurjonsson et al. |
| 2002/0143775 | A1 | 10/2002 | Wilkinson et al. |
| 2003/0033296 | A1 | 2/2003 | Rothmuller et al. |
| 2003/0110179 | A1 | 6/2003 | Barton |
| 2003/0115191 | A1 | 6/2003 | Copperman et al. |
| 2003/0237051 | A1 | 12/2003 | LaMarca et al. |
| 2004/0024739 | A1 | 2/2004 | Copperman et al. |
| 2005/0210416 | A1 | 9/2005 | MacLaurin et al. |
| 2006/0112076 | A1 | 5/2006 | Burris et al. |
| 2007/0174255 | A1 * | 7/2007 | Sravanapudi et al. ............ 707/3 |
| 2008/0016218 | A1 * | 1/2008 | Jones et al. ................... 709/226 |

FOREIGN PATENT DOCUMENTS

| | | |
|---|---|---|
| JP | 2005107688 A | 4/2005 |
| KR | 1020010098714 A | 11/2001 |
| KR | 1020020016056 A | 3/2002 |
| KR | 1020020089677 A | 11/2002 |
| WO | 2005103883 A1 | 11/2005 |
| WO | 2005122023 A1 | 12/2005 |
| WO | WO2006026636 A3 | 3/2006 |
| WO | WO2006036972 A3 | 4/2006 |

OTHER PUBLICATIONS

International Search Report for PCT Application No. PCT/US2008/051969 mailed on Jun. 24, 2008, 2 pages.
Artacho et al., "Using a High-Level Language to Describe and Create Web-Based Learning Scenarios", Date: Nov. 1999, http://sensei.lsi.uned.es/~miguel/articulos/fie99/1075.pdf#search=%22tagging%20%22heterogeneous%20objects%22%22.
Mathes, Adam, "Folksonomies—Cooperative Classification and Communication Through Shared Metadata", Date: Dec. 2004, http://blog.namics.com/archives/2005/Folksonomies Cooperative Classification.pdf.
"European Search Report", Mailed Date: Jul. 8, 2011, Application No. EP/08728236, Filed Date: Jul. 7, 2011, pp. 8. Niederee, et al., "Taxonomies in Operation, Design, and Meta-Design", Proceedings of the Third International Conference on Web Information Systems Engineering (Workshops), Jan. 1, 2002, pp. 10.
Ohmukai et al., "A Proposal of Communicty-based Folksonomy with RDF Metadata", Retrieved from the internet on Sep. 28, 2006, 8 pages. http://www.kasm.nii.ac.jp/papers/takeda/05/ohmukai05iswc.pdf.

* cited by examiner

*Primary Examiner* — Belinda Xue

(57) ABSTRACT

Techniques to manage vocabulary terms for a taxonomy system are described. An apparatus may comprise a managed taxonomy system having a vocabulary management module to manage a taxonomy of formal vocabulary terms organized in a hierarchical structure. The taxonomy may include a category for informal vocabulary terms stored as a list of keywords. Other embodiments are described and claimed.

18 Claims, 4 Drawing Sheets

TECHNIQUES TO MANAGE A TAXONOMY SYSTEM FOR HETEROGENEOUS RESOURCE DOMAIN

BACKGROUND

A managed taxonomy system attempts to manage a taxonomy for an application, device or network. A taxonomy attempts to define a common or standard vocabulary for interacting with an application or system. The standard vocabulary may then be used for different applications, such as classification applications, search applications, tagging applications, and so forth. To create a standard vocabulary, managed taxonomy systems attempt to build and manage a highly structured and formalized hierarchy of standard vocabulary terms. Managed taxonomy systems, however, are typically difficult to maintain and manage, particularly across heterogeneous systems that are typically not designed to use the same vocabulary. Consequently, there may be a need for improved techniques for managing vocabulary terms and relationships for a managed taxonomy system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments may be generally directed to techniques to manage vocabulary terms for a managed taxonomy system. In particular, some embodiments may be directed to techniques for managing vocabulary terms for a managed taxonomy system across heterogeneous resource domains. In one embodiment, for example, an apparatus such as a managed taxonomy system may include a vocabulary management module to manage a taxonomy of formal and informal vocabulary terms organized in a hierarchical structure. The managed taxonomy system may further include a vocabulary association module to associate a vocabulary term with multiple resources from different resource domains, and store the resource associations or resource relationships in a central database. The different resource domains may represent different or heterogeneous systems, devices, or applications. In this manner, a single managed taxonomy system may be used to manage resource associations or resource relationships uniformly across different resource domains, thereby allowing more efficient searching for resources, as well as other applications. Other embodiments are described and claimed.

DETAILED DESCRIPTION

Figure 1:
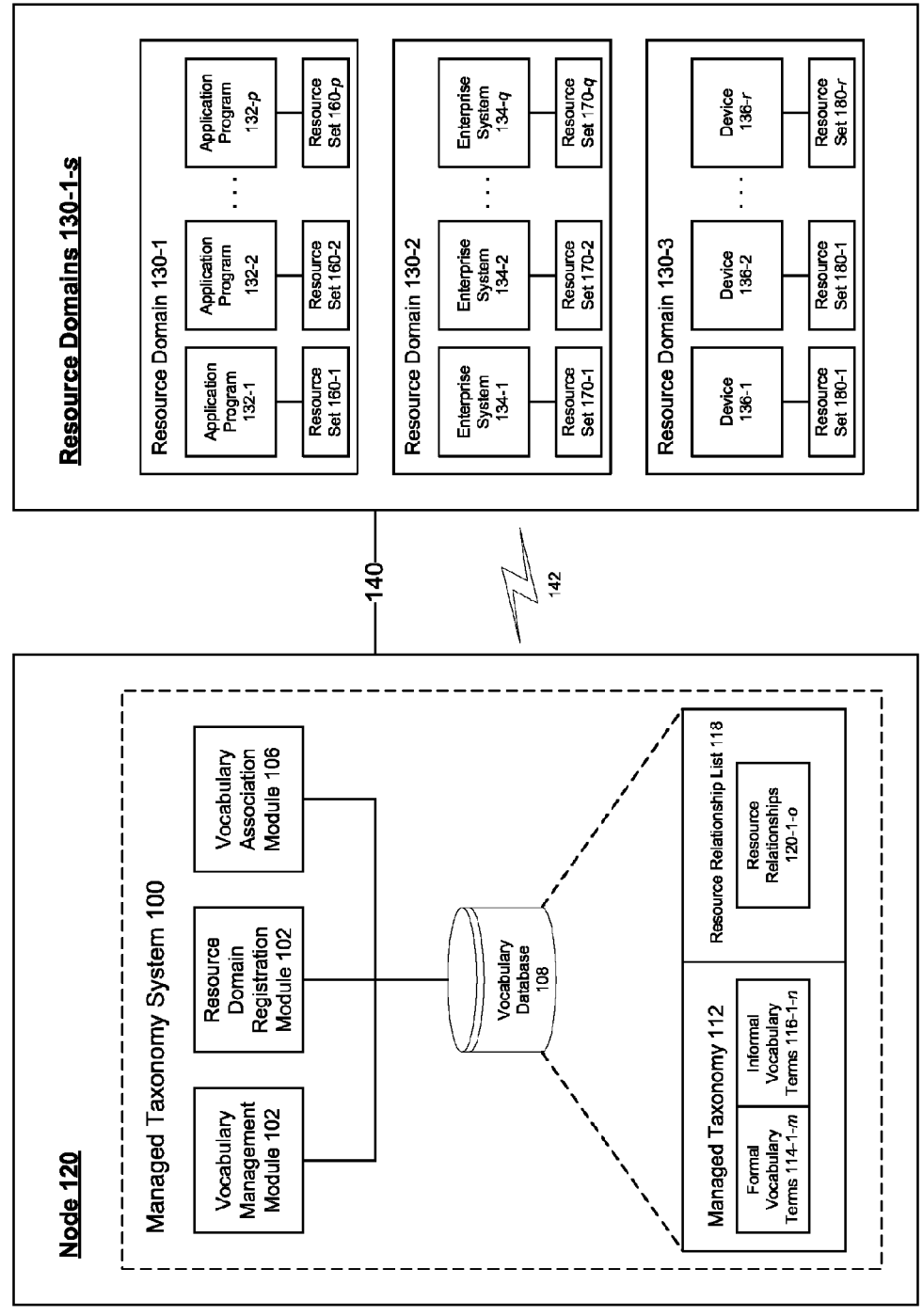
FIG. 1 illustrates one embodiment of managed taxonomy system.

Various embodiments may comprise one or more elements. An element may comprise any feature, characteristic, structure or operation described in connection with an embodiment. Examples of elements may include hardware elements, software elements, physical elements, or any combination thereof. Although an embodiment may be described with a limited number of elements in a certain arrangement by way of example, the embodiment may include more or less elements in alternate arrangements as desired for a given implementation. It is worthy to note that any references to "one embodiment" or "an embodiment" are not necessarily referring to the same embodiment.

Various embodiments may be generally directed to techniques to manage vocabulary terms for a managed taxonomy system. A taxonomy may generally refer to a structure, method or technique for classifying information or data. The vocabulary terms may include various types, including formal vocabulary terms and informal vocabulary terms. A managed taxonomy may refer to a taxonomy that is managed in accordance with a formal set of rules, procedures or guidelines for a given system. A managed taxonomy system may be any system arranged to store, process, communicate, and otherwise manage a defined taxonomy for an electronic system or collection of electronic systems.

More particularly, some embodiments may be directed to techniques for managing vocabulary terms for a managed taxonomy system across heterogeneous resource domains. A resource domain may refer to a logical or physical segmentation between groups or collections of resources. A resource may refer to a discrete or single set of data or data object. Examples of resources may include files, media files, text files, audio files, image files, video files, web pages, data items, and so forth. Typically, different resource domains are managed by different entities, such as different businesses, companies, systems, devices, application programs, and so forth. Further, each entity typically implements a unique managed taxonomy management system to define and manage its own vocabulary or taxonomy, and uses proprietary vocabulary terms for various knowledge-based applications, such as classification applications, search applications, tagging applications, and so forth. Consequently, such knowledge-based applications may be limited to a single resource domain utilizing a particular vocabulary. For example, a knowledge-based search application using a given vocabulary term may be limited to retrieving resources from a single resource domain, even though there may be resources related to the vocabulary term from other resource domains. Even when different resource domains use the same vocabulary term, the disparate managed taxonomy systems are typically not integrated, and therefore are unable to access resources associated with the common vocabulary term across the different resource domains.

To solve these and other problems, various embodiments may implement a uniform managed taxonomy system to manage vocabulary terms across heterogeneous or different resource domains. In one embodiment, for example, a managed taxonomy system may implement a vocabulary management module to manage a taxonomy of formal and informal vocabulary terms organized in a hierarchical structure. The managed taxonomy system may further include a vocabulary association module to associate a vocabulary term with multiple resources from different resource domains, and store the resource associations or resource relationships in a central database. In this manner, a single managed taxonomy system may be used to manage resource associations or resource relationships uniformly across different resource domains. Centralized management of a taxonomy across heterogeneous systems provides a centralized and shared database of vocabulary terms and relationships, which may be used for various knowledge-based applications such as classification applications, search applications, tagging applications, and so forth. By having a common set of vocabulary terms that can apply across various heterogeneous systems, and a central store for managing the relationships, it becomes possible to now relate otherwise disconnected systems with each other.

FIG. 1 illustrates a block diagram of a knowledge system 150. The knowledge system 150 may represent any system or network suitable for implementing a managed taxonomy for knowledge-based applications, such as classification applications, search applications, tagging applications, and so forth. By way of example, the knowledge system 150 may include a node 110 having a managed taxonomy system 100. The node 110 may be communicatively coupled to one or more resource domains 130-1-s, where s represents a positive integer, via one or more wired communications media 140 and/or wireless communications media 142. It may be appreciated that the knowledge system 150 may include other elements not shown in the example provided in FIG. 1.

As shown in FIG. 1, the knowledge system 150 may include various resource domains 130-1-s. The resource domains 130-1-s may represent examples of heterogeneous resource domains suitable for use with the managed taxonomy system 100 of the node 110. A resource domain may refer to a logical or physical segmentation between groups or collections of resources. A resource may refer to a discrete or single set of data or data object. Examples of resources may include files, media files, text files, audio files, image files, video files, web pages, data items, and any other discrete data set. Examples of some resource domains 130-1-s may include resource domain 130-1 representing application programs 132-1-p, resource domain 130-2 representing enterprise systems 134-1-q, and resource domain 130-3 representing devices 136-1-r. It is worthy to note that resource domains 130-1, 130-2 and 130-3 may each represent a separate resource domain, and further, each element listed for each resource domain may also represent a separate resource domain. For example, application programs 132-1, 132-2 may represent two different heterogeneous resource domains as described and claimed herein.

In one embodiment, for example, a resource domain 130-1 may represent multiple application programs 132-1-p. Each of the application programs 132-1-p may manage, or be coupled to, a respective resource set 160-1-p, with each resource set 160-1-p representing multiple resources or resource objects. Application programs generally may allow a user to accomplish one or more specific tasks. Examples of application programs may include, without limitation, one or more messaging applications (e.g., telephone, voicemail, facsimile, e-mail, IM, SMS, MMS, video conferencing), a web browser application, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. In various implementations, the application programs may provide one or more graphical user interfaces (GUIs) to communicate information between the application program and a user. By way of example only, assume the application program 132-1 is implemented as WINDOWS® MEDIA PLAYER made by MICROSOFT® CORPORATION, while the application program 132-2 is implemented as MICROSOFT OUTLOOK® made by MICROSOFT CORPORATION. The embodiments, however, are not limited to these examples.

In one embodiment, for example, a resource domain 130-2 may represent multiple enterprise systems 134-1-q. An enterprise system is typically an information technology (IT) or knowledge system implemented for a specific business entity. Enterprise systems 134-1-q may represent multiple enterprise systems implemented for the same entity, or different entities. Each of the enterprise systems 134-1-q may manage, or be coupled to, a respective resource set 170-1-q, with each resource set 170-1-q representing multiple resources or resource objects.

In one embodiment, for example, a resource domain 130-3 may represent multiple devices 136-1-r. Devices 136-1-r may represent any type of electronic device, such as (he examples provided for the node 110 as previously described. Each of the devices 132-1 -r may manage, or be coupled to. a respective resource set 180-1-r, with each resource set 180-1-r representing multiple resources or resource objects.

In various embodiments, each of the resource domains 130-1, 130-2 and 130-3 and possibly their sub-domains typically maintain a separate set of resources. For example, application program 132-1 implemented as WINDOWS MEDIA PLAYER® may have a set of resources in the form of media files, while application program 132-2 implemented as MICROSOFT OUTLOOK® may have a set of resource in the form of contact items, calendar items, task items, memo items, email items, and so forth. Assume a first user tags a media file with a product name, while a second user tags an email item with a product name. In conventional systems, a search by product name would need to be implemented separately for respective application programs 132-1, 132-2. Further, the search results for both may need to be correlated to determine whether the product name refers to the same product. Such a process may be limiting and tedious for a user, and the problem becomes exponentially worse as the number of application programs 132-1-p increases.

In order to reduce such problems, the knowledge system 150 may include a node 110 implementing a managed taxonomy system 100 that may be used across some or all of the resource domains 130-1-s. The node 110 may represent any suitable electronic device or system arranged to implement the managed taxonomy system 100, such as a processing system, computer, server, work station, appliance, terminal, personal computer, laptop, ultra-laptop, handheld computer, minicomputer, mainframe computer, distributed computing system, multiprocessor systems, processor-based systems, consumer electronics, programmable consumer electronics, personal digital assistant, television, digital television, set top box, telephone, mobile telephone, cellular telephone, handset, wireless access point, base station, subscriber station, mobile subscriber center, radio network controller, router, hub, gateway, bridge, switch, machine, or combination thereof. The embodiments are not limited in this context.

In various embodiments, the managed taxonomy system 100 may represent any system arranged to store, process, communicate, and otherwise manage a defined or managed taxonomy for an electronic system or collection of electronic systems. As shown in FIG. 1, one embodiment of the managed taxonomy system 100 may include a vocabulary management module 102, a resource domain registration module 104, a vocabulary association module 106, and a vocabulary database 108. The vocabulary database 108 may store a managed taxonomy 112 and a resource relationship list 118. The managed taxonomy 112 may comprise formal vocabulary terms 114-1-m and informal vocabulary terms 116-1-n. The resource relationship list 118 may comprise multiple resource relationships 120-1-o. In various embodiments, access to the managed taxonomy 112 and/or the resource relationship list 118 may be provided through various techniques, such as one or more software interfaces implemented as a set of application program interfaces (API), graphic user interface techniques such as selection boxes or pull down menus, and so forth. In this manner, the managed taxonomy 112 and/or the resource relationship list 118 may be exposed for use by various applications. The embodiments are not limited in this context.

Although FIG. 1 illustrates the resource relationship list 118 as part of the node 110, it may be appreciated that the resource relationship list 118 may be may allow a user to accomplish one or more specific tasks. Examples of application programs may include without limitation, one or more messaging applications (e.g., telephone, voicemail, facsimile, e-mail, IM, SMS, MMS, video conferencing), a web browser application, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. In various implementations, the application programs may provide one or more graphical user interfaces (GUIs) to communicate information between the application program and a user. By way of example only, assume the application program 132-1 is implemented as WINDOWS® MEDIA PLAYER made by MICROSOFT® CORPORATION, while the application program 132-2 is implemented as MICROSOFT OUTLOOK® made by MICROSOFT® CORPORATION. The embodiments, however, are not limited to these examples.

As used herein the term "module" may include any structure implemented using hardware elements, software elements, or a combination of hardware and software elements. In one embodiment, for example, the modules described herein are typically implemented as software elements stored in memory and executed by a processor to perform certain defined operations. It may be appreciated that the defined operations, however, may be implemented using more or less modules as desired for a given implementation. It may be further appreciated that the defined operations may be implemented using hardware elements based on various design and performance constraints. The embodiments are not limited in this context.

In various embodiments, the managed taxonomy system 100 may be used to manage any defined taxonomy. An entity such as a company, business or enterprise may use different application programs to manage information across the entity. Often the vocabulary and taxonomy for an entity varies with the type of entity and a given set of products and/or services. In one embodiment, for example, the managed taxonomy system 100 may be used to manage specific vocabulary terms for entities operating within a computing and/or communications environment, sometimes referred to as an online environment. In this context such vocabulary terms are sometimes referred to as "metadata." Metadata may refer to structured, encoded data that describe characteristics of information-bearing entities to aid in the identification, discovery, assessment, and management of the described entities. Generally, a set of metadata describes a single object or set of data, called a resource. Metadata may be of particular use for such applications as information retrieval, information cataloging, and the semantic web. For example, the vocabulary terms may be metadata used as tags for tagging operations. A tag is a relevant keyword or term associated with or assigned to a piece of information or resource. The tag may thus describe the resource and enable keyword-based classification of the resource.

One problem with conventional managed taxonomy systems is integrating the vocabulary informality typically associated with tagging operations and other "Web 2.0" applications with the vocabulary formality typically used for business and enterprise systems. Tags are usually chosen informally and personally by the author/creator of the item, and are not typically part of some formally defined classification scheme. Rather, tags are typically used in dynamic, flexible, automatically generated internet taxonomies for online resources, such as computer files, web pages, digital images, and internet bookmarks. A business or enterprise, however, typically defines its vocabulary using a very specific and formal scientific ontology. A managed taxonomy system for a business or enterprise may therefore face considerable challenges in balancing the creativity of growth with the certainty needed in a business environment.

Vocabulary structure for a system may be viewed as more of a continuum rather than a discrete series of binary choices. At one end of the continuum there is no managed vocabulary. People may associate keywords with a document, but there is no system in place to use them. Search consists solely of full text crawling. At the next level, the vocabulary is a flat list of keywords, which is a common well from which users can select a term. Depending on the infrastructure surrounding this vocabulary, you can still get some useful features out of the system. Different applications within the company can be speaking the same semantic language, allowing these different systems to communicate with each other. Another level is to track some sort of relationship between the various terms in the vocabulary. Yet another level is defining previous associations, such as equality relationships. The equality relationships may comprise business specific synonyms in the vocabulary pushed into a custom thesaurus or dictionary. This may be useful when a product moves through various incarnations with different names, or when two different development teams within an enterprise try and consolidate their individual vocabularies into a single shared vocabulary. Finally, the other end of the continuum may be an ontological vocabulary that adds named relationships to the vocabulary. Relationships like "competes with" or "makes" give an even greater amount of information to the rest of the system. It is at this point that you no longer need to know what you are searching for to find it. For example, a search may be performed for "back pain medication" without previously knowledge of particular back pain medications.

In various embodiments, the managed taxonomy system 100 attempts to operate within this vocabulary structure continuum. More particularly, the managed taxonomy system 100 attempts to provide a higher level of integration between the informal vocabulary terms generated by authors and creators of a resource (e.g., as used for tagging operations), with the formal vocabulary terms comprising part of a scientific ontology used to typically define a vocabulary for business or enterprise operations. The managed taxonomy system 100 may be designed with a hybrid approach to vocabulary management, with certain areas of the vocabulary that are highly structured, and other areas of the vocabulary that are managed as a flat list of keywords. For example, the vocabulary terms dealing with specific product groups and their associated products for a business may be relatively straightforward to place in hierarchies with defined relationships. Vocabulary terms dealing with specific general technologies, however, may be not be used enough inside a given business to warrant the additional overhead of managing them in anything other than a keyword list. This hybrid approach allows a business to start from a very loose freeform based system and grow towards a more structured and possibly process driven vocabulary as their needs and sophistication warrant. Most companies will be in this hybrid state, with sections of their vocabulary being very polished where the data either tends to be more easily structured, or where certain business segments demand it (e.g., company organizational charts, legal terms, marketing terms, and so forth), while other areas may be less structured with more keyword buckets and where relationships are derived through algorithmic analysis or end user suggestions.

Referring again to FIG. 1, the managed taxonomy system 100 may include the vocabulary management module 102. The vocabulary management module 102 may be arranged to manage vocabulary terms for a managed taxonomy 112 stored by vocabulary database 108. The managed taxonomy 112 may comprise various types, such as formal vocabulary terms 114-1-m and informal vocabulary terms 116-1-n, where m and n represent positive integers. In one embodiment, for example, the vocabulary management module 102 may organize the managed taxonomy 112 with the formal vocabulary terms 114-1-m in a hierarchical structure. The vocabulary management module 102 may also create and maintain a hybrid category for informal vocabulary terms 116-1-n stored as a list of keywords. Based on usage and other factors, the vocabulary management module 102 may eventually promote or convert one or more of the informal vocabulary terms 116-1-n to a formal vocabulary term 114-1-m for insertion into the hierarchical structure created for the formal vocabulary terms 114-1-m.

In one embodiment, for example, the managed taxonomy system 100 may include the resource domain registration module 104. In order for a new resource domain 130-1-s to be managed by the managed taxonomy system 100, or use the managed taxonomy 112, the new resource domain 130-1-s should first register with the managed taxonomy system 100. Accordingly, the resource domain registration module 104 may be arranged to register a resource domain 130-1-s with the managed taxonomy system 100. Once registered, the resource domain 130-1-s may access the managed taxonomy 112 and various features offered by the managed taxonomy system 100. For example, the resource domain 130-1-s may use vocabulary association module 106 to perform tagging operations and store the created resource relationships 120-1-o in the vocabulary database 108.

In one embodiment, for example, the managed taxonomy system 100 may include the vocabulary association module 106. The vocabulary association module 106 may be arranged to associate a formal vocabulary term 114-1-m or informal vocabulary term 116-1-n with a resource, such as a resource from resource sets 160-1-p, 170-1-q or 180-1-r. The association operations are representative of tagging operations where a tag or metadata is associated with a given resource. For example, a data object such as a picture may be tagged with metadata such as a date, a time, a place, a photographer, an event, and so forth. Once a formal vocabulary term 114-1-m or informal vocabulary term 116-1-n has been stored in the vocabulary database 108, the vocabulary management module 102 may send a message to the vocabulary association module 106 notifying the vocabulary association module 106 of the formal vocabulary term 114-1-m or informal vocabulary term 116-1-n. A user interface or graphic user interface may be used to present a list of the formal vocabulary terms 114-1-m or informal vocabulary terms 116-1-n to a user. A user may select one or more of the formal vocabulary terms 114-1-m or informal vocabulary terms 116-1-n, relate or associate the selected the formal vocabulary term 114-1-m or informal vocabulary term 116-1-n with a resource, and return a user selected resource relationship 120-1-o to the vocabulary association module 106. The vocabulary association module 106 may store the resource relationship 120-1-o in the resource relationship list 118 of the vocabulary database 108.

In one embodiment, for example, the managed taxonomy system 100 may include the vocabulary database 108. Vocabulary database 108 may be used to store the managed taxonomy 112 and the resource relationship list 118 for the managed taxonomy system 100. In one embodiment, for example, the managed taxonomy 112 may be implemented as a hierarchical structure of various types, commonly displaying parent-child relationships. Although one embodiment may describe a managed taxonomy 112 in terms of a hierarchical structure or organization, the managed taxonomy 112 may also be implemented as other non-hierarchical structures having various topologies, such as network structures, organization of objects into groups or classes, alphabetical lists, keyword lists, and so forth. The embodiments are not limited in this context.

In one embodiment, for example, the vocabulary database 108 may also store resource relationships 120-1-o representing a relationship between a given vocabulary term and a particular resource. In some cases, the resource relationships 120-1-o may sometimes be referred to as "resource associations." As used herein, the terms "resource relationship" and "resource association" have similar meanings, and are used interchangeably (collectively referred to as "resource relationship").

The resource relationship 120-1-o may be created via vocabulary association module 106, and stored in the resource relationship list 118 of vocabulary database 108. Since the resource relationships 120-1-o may represent defined or tagged relationships between vocabulary terms from the managed taxonomy 112 as applied to different resource domains 130-1-s, the resource relationships 120-1-o may be used for various knowledge-based applications across heterogeneous resource domains 130-1-s. For example, a knowledge-based search application for a vocabulary term that is part of the managed taxonomy 112 may retrieve resources across the various resource domains 130-1-s based on the resource relationships 120-1-o stored in the resource relationship list 118 in the central vocabulary database 108.

Figure 2:
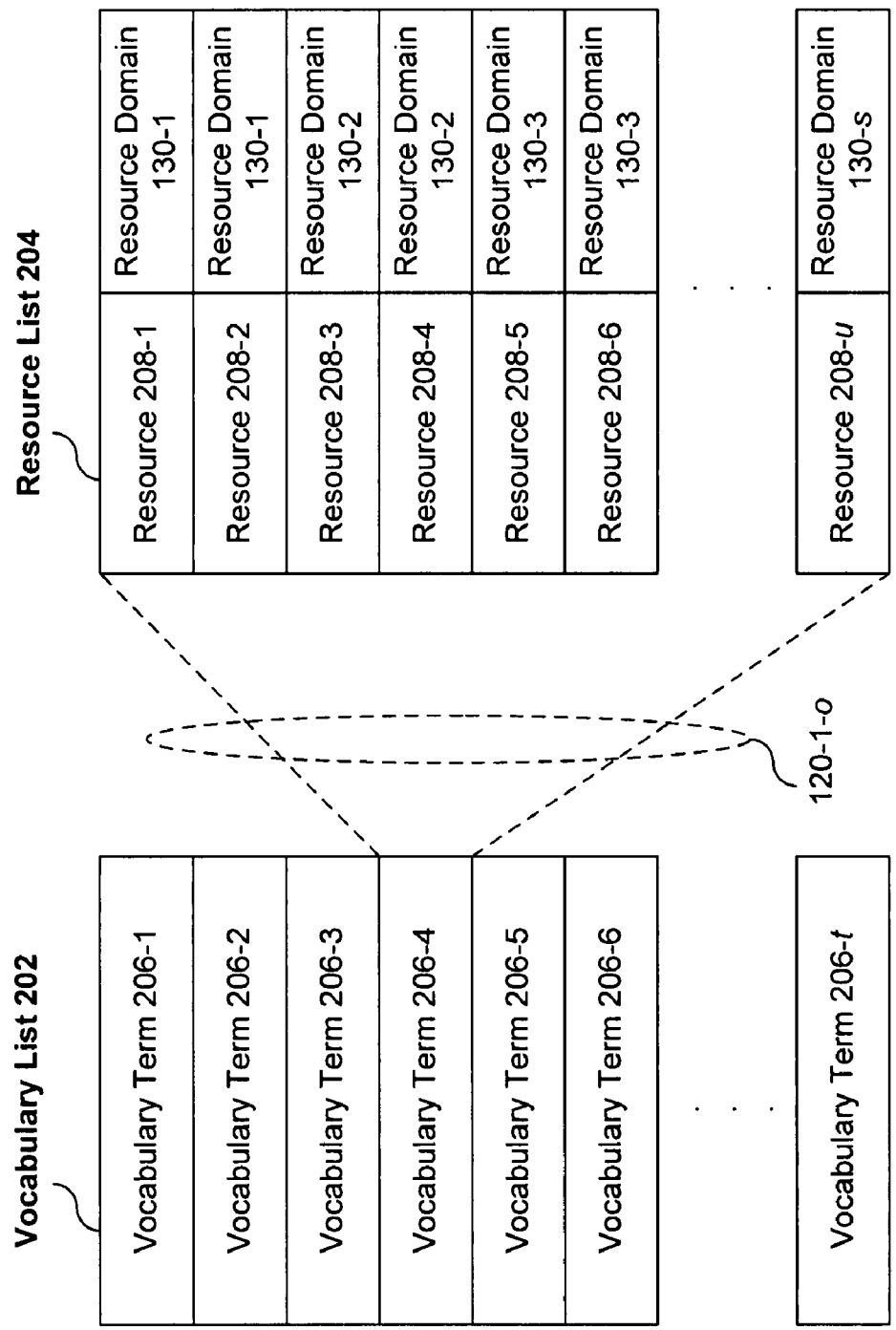
FIG. 2 illustrates one embodiment of resource relationships.

FIG. 2 illustrates an example of resource relationships 120-1-o. The resource relationships 120-1-o may include two lists, with a first list comprising a vocabulary list 202 and a second list comprising a resource list 204. The vocabulary list 202 may comprise multiple vocabulary terms 206-1-t representing any number of formal vocabulary terms 114-1-m and/or informal vocabulary terms 116-1-n. The vocabulary terms 206-1-t may have relationships or associations with resources from the resource domains 130-1-s or their sub-domains. The resource list 204 may comprise multiple resources 208-1-u and the corresponding domains 130-1-s for the resources 208-1-u. The resources 208-1-u may represent individual resource or resource objects from the resource sets 160, 170 and 180, for example. The resource relationships 120-1-o may also include other information about specific resource/vocabulary couplings, such as the author of a given coupling, security details, visibility scope, or other details as desired for a given implementation.

As shown in FIG. 2, the vocabulary term 206-4 may have multiple defined resource relationships 120-1-o with resources 208-1, 208-2 from resource domain 130-1, resources 208-3, 208-4 from resource domain 130-2, and resources 208-5, 208-6 from resource domain 130-3. The multiple resource relationships 120-1-o allow knowledge-based applications such as searching to locate resources across the heterogeneous resources domains 130-1-s. This may reduce or avoid the need to perform separate searches for each resource domain 130-1-s. Further, this may reduce or avoid the need to find synonyms for a target vocabulary term that is defined for each resource domain 130-1-s, which may or may not exist.

By way of example, assume that vocabulary term 206-4 represents a product name of "PRODUCT." Further, assume that a first resource relationship 120-1 comprises a resource 208-1 representing a media file for a marketing presentation for the PRODUCT managed by the application program 132-1 implemented as the WINDOWS MEDIA PLAYER®. Assume that a second resource relationship 120-2 comprises a resource 208-2 representing a contact item for an author of the media file for the PRODUCT managed by the application program 132-2 implemented as the MICROSOFT OUTLOOK®. Assume that a third resource relationship 120-3 comprises a resource 208-3 representing a supplier contract for the PRODUCT managed by the enterprise system 134-1 as owned by the supplier. In general operation, a search application using the vocabulary term PRODUCT will return the media file 208-1, the contact item 208-2, and the supplier contract 208-3.

Operations for apparatus 100 may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more elements of apparatus 100 or alternative elements as desired for a given set of design and performance constraints.

Figure 3:
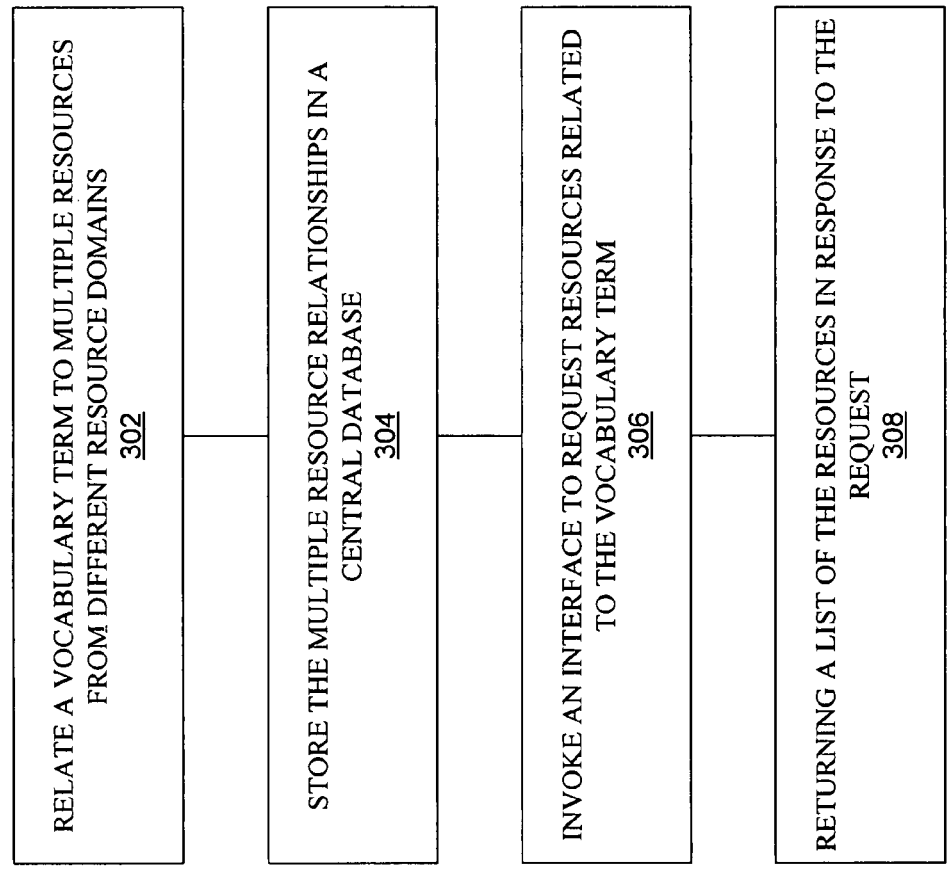
FIG. 3 illustrates one embodiment of a logic flow.

FIG. 3 illustrates a logic flow 300. Logic flow 300 may be representative of the operations executed by one or more embodiments described herein. As shown in FIG. 3, the logic flow 300 may relate a vocabulary term to multiple resources from different resource domains at block 302. The logic flow 300 may store the multiple resource relationships in a central database at block 304. The logic flow 300 may invoke an interface to request resources related to the vocabulary term at block 306. The logic flow 300 may return a list of the resources in response to the request at block 308. The embodiments are not limited in this context.

Figure 4:
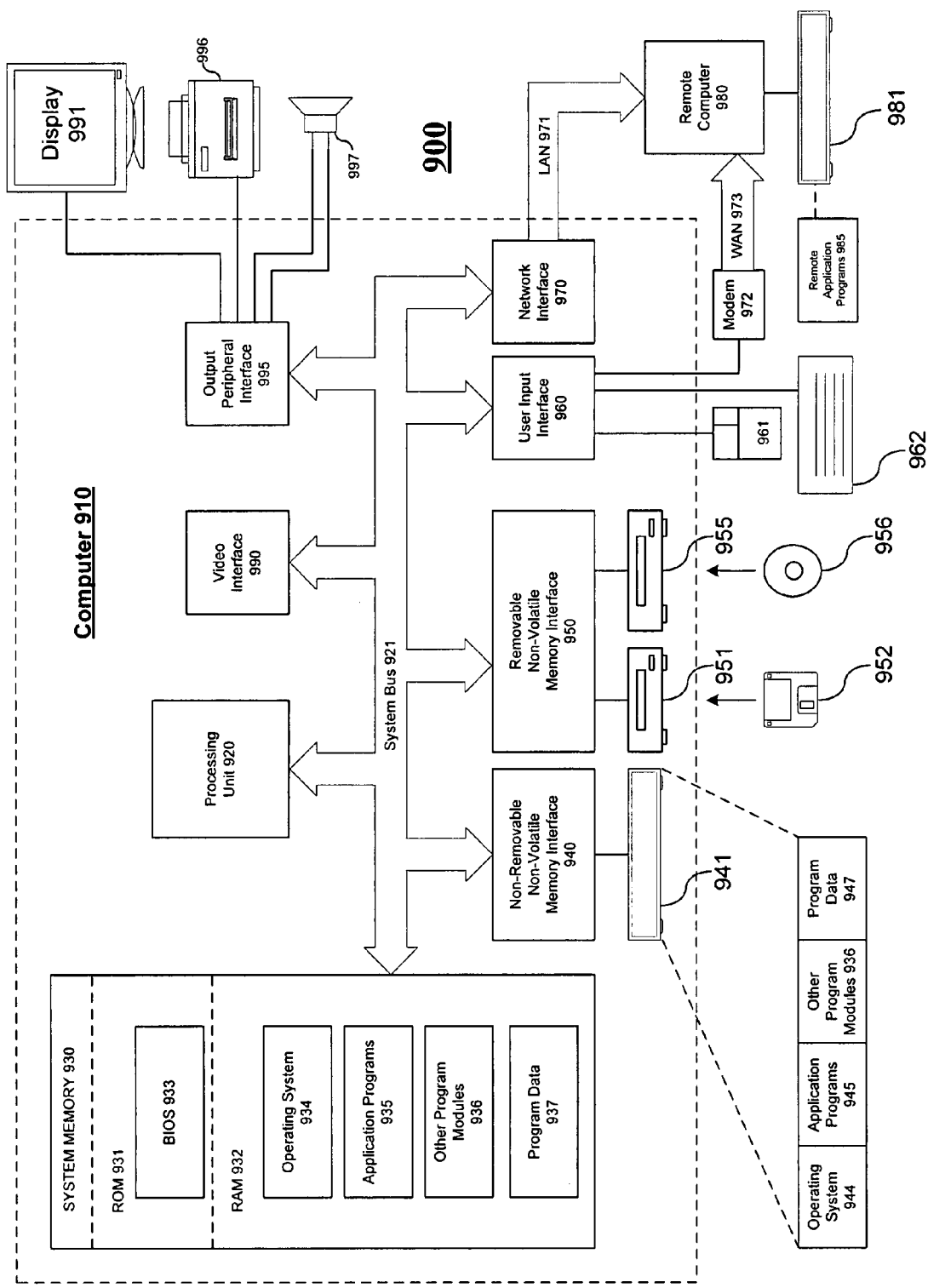
FIG. 4 illustrates one embodiment of a computing system architecture.

FIG. 4 illustrates a block diagram of a computing system architecture 900 suitable for implementing various embodiments, including the managed taxonomy system 100. It may be appreciated that the computing system architecture 900 is only one example of a suitable computing environment and is not intended to suggest any limitation as to the scope of use or functionality of the embodiments. Neither should the computing system architecture 900 be interpreted as having any dependency or requirement relating to any one or combination of components illustrated in the exemplary computing system architecture 900.

Various embodiments may be described in the general context of computer-executable instructions, such as program modules, being executed by a computer. Generally, program modules include any software element arranged to perform particular operations or implement particular abstract data types. Some embodiments may also be practiced in distributed computing environments where operations are performed by one or more remote processing devices that are linked through a communications network. In a distributed computing environment, program modules may be located in both local and remote computer storage media including memory storage devices.

As shown in FIG. 4, the computing system architecture 900 includes a general purpose computing device such as a computer 910. The computer 910 may include various components typically found in a computer or processing system. Some illustrative components of computer 910 may include, but are not limited to, a processing unit 920 and a memory unit 930.

In one embodiment, for example, the computer 910 may include one or more processing units 920. A processing unit 920 may comprise any hardware element or software element arranged to process information or data. Some examples of the processing unit 920 may include, without limitation, a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, the processing unit 920 may be implemented as a general purpose processor. Alternatively, the processing unit 920 may be implemented as a dedicated processor, such as a controller, microcontroller, embedded processor, a digital signal processor (DSP), a network processor, a media processor, an input/output (I/O) processor, a media access control (MAC) processor, a radio baseband processor, a field programmable gate array (FPGA), a programmable logic device (PLD), an application specific integrated circuit (ASIC), and so forth. The embodiments are not limited in this context.

In one embodiment, for example, the computer 910 may include one or more memory units 930 coupled to the processing unit 920. A memory unit 930 may be any hardware element arranged to store information or data. Some examples of memory units may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), EEPROM, Compact Disk ROM (CD-ROM), Compact Disk Recordable (CD-R), Compact Disk Rewriteable (CD-RW), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk (e.g., floppy disk, hard drive, optical disk, magnetic disk, magneto-optical disk), or card (e.g., magnetic card, optical card), tape, cassette, or any other medium which can be used to store the desired information and which can accessed by computer 910. The embodiments are not limited in this context.

In one embodiment, for example, the computer 910 may include a system bus 921 that couples various system components including the memory unit 930 to the processing unit 920. A system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, and so forth. The embodiments are not limited in this context.

In various embodiments, the computer 910 may include various types of storage media. Storage media may represent any storage media capable of storing data or information, such as volatile or non-volatile memory, removable or non-removable memory, erasable or non-erasable memory, writeable or re-writeable memory, and so forth. Computer readable media may include storage media adapted for reading and writing to a computing system, such as the computing system architecture 900. Examples of computer readable media for computing system architecture 900 may include, but are not limited to, volatile and/or nonvolatile memory such as ROM 931 and RAM 932. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio-frequency (RF) spectrum, infrared and other wireless media. Combinations of the any of the above should also be included within the scope of computer readable media.

In various embodiments, the memory unit 930 includes computer storage media in the form of volatile and/or nonvolatile memory such as ROM 931 and RAM 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 4 illustrates operating system 934, application programs 935, other program modules 936, and program data 937.

The computer 910 may also include other removable/non-removable, volatile/nonvolatile computer storage media. By way of example only, FIG. 4 illustrates a hard disk drive 940 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 4, provide storage of computer readable instructions, data structures, program modules and other data for the computer 910. In FIG. 4, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into the computer 910 through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. In addition to the monitor 991, computers may also include other peripheral output devices such as speakers 997 and printer 996, which may be connected through an output peripheral interface 990.

The computer 910 may operate in a networked environment using logical connections to one or more remote computers, such as a remote computer 980. The remote computer 980 may be a personal computer (PC), a server, a router, a network PC, a peer device or other common network node, and typically includes many or all of the elements described above relative to the computer 910, although only a memory storage device 981 has been illustrated in FIG. 4 for clarity. The logical connections depicted in FIG. 4 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other technique suitable for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 4 illustrates remote application programs 985 as residing on memory device 981. It will be appreciated that the network connections shown are exemplary and other techniques for establishing a communications link between the computers may be used. Further, the network connections may be implemented as wired or wireless connections. In the latter case, the computing system architecture 900 may be modified with various elements suitable for wireless communications, such as one or more antennas, transmitters, receivers, transceivers, radios, amplifiers, filters, communications interfaces, and other wireless elements. A wireless communication system communicates information or data over a wireless communication medium, such as one or more portions or bands of RF spectrum, for example. The embodiments are not limited in this context.

Some or all of the managed taxonomy system 100 and/or computing system architecture 900 may be implemented as a part, component or sub-system of an electronic device. Examples of electronic devices may include, without limitation, a processing system, computer, server, work station, appliance, terminal, personal computer, laptop, ultra-laptop, handheld computer, minicomputer, mainframe computer, distributed computing system, multiprocessor systems, processor-based systems, consumer electronics, programmable consumer electronics, personal digital assistant, television, digital television, set top box, telephone, mobile telephone, cellular telephone, handset, wireless access point, base station, subscriber station, mobile subscriber center, radio network controller, router, hub, gateway, bridge, switch, machine, or combination thereof. The embodiments are not limited in this context.

In some cases, various embodiments may be implemented as an article of manufacture. The article of manufacture may include a storage medium arranged to store logic and/or data for performing various operations of one or more embodiments. Examples of storage media may include, without limitation, those examples as previously provided for the memory unit 130. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
relating a vocabulary term to multiple resources from different heterogeneous resource domains, wherein said vocabulary term is from a managed taxonomy having a hierarchy of formal vocabulary terms and informal vocabulary terms, said formal vocabulary terms comprising part of a scientific ontology for an enterprise and said informal vocabulary terms generated by creators of resources, said different heterogeneous resource domains represent an application program and at least one of a web page, an enterprise system or a device, and said multiple resources including one or more files of a set of files managed by said application program;
storing said multiple resource relationships between said vocabulary term and said multiple resources in a central database;
invoking an interface to request resources related to said vocabulary term;
retrieving, in response to said request, a list of said multiple resources from said different heterogeneous resource domains based on said stored multiple resource relationships; and
returning said list.

2. The method of claim 1, comprising relating a formal vocabulary term from a managed taxonomy to said multiple resources from said different resource domains.

3. The method of claim 1, comprising relating an informal vocabulary term from a managed taxonomy to said multiple resources from said different resource domains.

4. The method of claim 1, comprising registering a resource domain with a resource in order to relate said resource with said vocabulary term.

5. The method of claim 1, comprising relating said vocabulary term to multiple heterogeneous resources from different resource domains.

6. The method of claim 1, comprising relating said vocabulary term to multiple resources from different resource domains representing different application programs.

7. The method of claim 1, comprising relating said vocabulary term to multiple resources from different resource domains representing different enterprise systems.

8. An article of manufacture comprising a storage medium containing instructions that when executed enable a system to:
associate a vocabulary term from a managed taxonomy to multiple resources from different heterogeneous resource domains, wherein said vocabulary term is from a managed taxonomy having a hierarchy of formal vocabulary terms and informal vocabulary terms, said formal vocabulary terms comprising part of a scientific ontology for an enterprise and said informal vocabulary terms generated by creators of resources, said different heterogeneous resource domains represent an application program and at least one of a web page, an enterprise system or a device, and said multiple resources including one or more files of a set of files managed by said application program;

store said multiple resource associations between said vocabulary term and said multiple resources in a central database;

receive a request for resources associated with said vocabulary term;

retrieve, in response to said request, a list of said multiple resources from said different heterogeneous resource domains based on said stored multiple resource associations; and provide said list.

9. The article of claim 8, further comprising instructions that when executed enable the system to relate a formal vocabulary term from said managed taxonomy to said multiple resources from said different resource domains.

10. The article of claim 8, further comprising instructions that when executed enable the system to relate an informal vocabulary term from said managed taxonomy to said multiple resources from said different resource domains.

11. The article of claim 8, further comprising instructions that when executed enable the system to register a resource domain with a resource in order to relate said resource with said vocabulary term.

12. The article of claim 8, further comprising instructions that when executed enable the system to relate said vocabulary term to multiple heterogeneous resources from different resource domains.

13. The article of claim 8, further comprising instructions that when executed enable the system to relate said vocabulary term to multiple resources from different resource domains representing different application programs.

14. The article of claim 8, further comprising instructions that when executed enable the system to relate said vocabulary term to multiple resources from different resource domains representing different enterprise systems.

15. An apparatus comprising a managed taxonomy system having:

a processor; and a memory coupled to said processor, said memory to store various modules arranged for execution by said processor, said modules comprising:

a vocabulary management module to manage a taxonomy of formal vocabulary terms and informal vocabulary terms organized in a hierarchical structure, said formal vocabulary terms comprising part of a scientific ontology for a business and said informal vocabulary terms generated by authors of resources;

a vocabulary association module to associate a vocabulary term with multiple resources from different heterogeneous resource domains, wherein the different heterogeneous resource domains represent an application program and at least one of a web page, an enterprise system or a device, said multiple resources including one or more files of a set of files managed by said application program; and a central database to store resource associations, said central database operative to, in response to a request to for resources related to said vocabulary term, retrieve a list of said multiple resources from said different heterogeneous resource domains based on said stored resource associations.

16. The apparatus of claim 15, comprising a resource domain registration module to register a resource domain with said managed taxonomy system.

17. The apparatus of claim 15, said resource domains to include resources managed by different application programs.

18. The apparatus of claim 15, said resource domains to include resources managed by different enterprise systems.

* * * * *